United States Patent
Krenn et al.

(10) Patent No.: US 6,360,154 B1
(45) Date of Patent: Mar. 19, 2002

(54) PROCESS AND DEVICE FOR ENGINE AND TRANSMISSION CONTROL IN A MOTOR VEHICLE

(75) Inventors: Helmut Krenn, Unterfoehring; Lothar Wolf, Munich, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/649,219

(22) Filed: Aug. 28, 2000

(30) Foreign Application Priority Data

Aug. 27, 1999 (DE) ......................................... 199 40 703

(51) Int. Cl.⁷ .............................................. B60K 41/04
(52) U.S. Cl. .............................. 701/54; 701/84; 701/87; 477/155
(58) Field of Search ........................... 701/54, 51, 58, 701/66, 84, 87; 477/155, 107, 43

(56) References Cited

U.S. PATENT DOCUMENTS

| | | | |
|---|---|---|---|
| 4,893,526 A | | 1/1990 | Tokoro .......................... 74/866 |
| 5,980,413 A | * | 11/1999 | Anderson et al. ............ 475/198 |
| 5,983,740 A | * | 11/1999 | Salecker et al. ........... 74/336 R |
| 6,076,032 A | * | 6/2000 | Kuroda et al. .................. 701/54 |
| 6,173,227 B1 | * | 1/2001 | Speicher et al. ............... 701/51 |

FOREIGN PATENT DOCUMENTS

| | | |
|---|---|---|
| DE | 4309903 A1 | 5/1994 |
| DE | 4327906 A1 | 2/1995 |
| DE | 18625936 A1 | 1/1998 |
| DE | 19703863 A1 | 8/1998 |

OTHER PUBLICATIONS

Von Ulrich Eggert, Koeln, "CVT–Getriebe: Elektronische Regelung und Fahrdynamik", 1992, pp. 26, 29–30, 33–36, 39–40, 43, 46, 49.

* cited by examiner

*Primary Examiner*—Tan Nguyen
(74) *Attorney, Agent, or Firm*—Crowell & Moring LLP (57) ABSTRACT

The invention concerns a process and a device for engine and transmission control in a motor vehicle with an internal combustion engine controlled by an engine control and a stepped automatic transmission controlled by a transmission control. A desired transmission output torque is realized in that except during gear shifting of the stepped automatic transmission at least the gear ratio is detected, an engine torque default (M_IND_ACC) affecting the filling and/or an engine torque default (M_IND_GS) affecting the ignition are calculated from at least the gear ratio and the transmission output torque, and these dimensions are relayed to the engine control, which controls the filling and the ignition of the internal combustion engine taking into account at least these dimensions, and during gear shifting a synchronization engine torque default (M_IND_SYNC) is calculated which provides the engine torque required at the moment after gear shifting, the engine torque default (M_IND_ACC) affecting the filling during gear shifting is calculated from at least the synchronization engine torque default, the engine torque default (M_IND_GS, M_IND_GSZF) affecting the ignition is determined in such a way that a default speed trace dependent on the gear ratio change upon the gear shifting of the transmission is adjusted,the engine torque (M_IND) realizable by the engine is determined.

11 Claims, 7 Drawing Sheets

PROCESS AND DEVICE FOR ENGINE AND TRANSMISSION CONTROL IN A MOTOR VEHICLE

BACKGROUND AND SUMMARY OF THE INVENTION

This application claims the priority of German Application 19940703.7, filed Aug. 27, 1999, the disclosure of which is expressly incorporated by reference herein.

The invention concerns a process and a device for engine and transmission control.

In motor vehicles with internal combustion engines, the speed and torque range of the engine is reproduced in the speed and torque range of the wheels through a transmission.

In older vehicles, an accelerator is connected directly with the throttle of a vehicle, so that an engine torque corresponding to the application of the accelerator results. This torque is transferred to the drive wheels according to the gear ratio. If a stepped automatic transmission is used between the propulsion engine and the drive wheels, then in this embodiment a step-shaped trace of the transmission output torque resulting from gear shifting is produced.

However, mechanically decoupling the accelerator from the throttle is also known. In U.S. Pat. No. 4,893,526, for example, a desired value for a transmission output torque is determined from the longitudinal speed of the vehicle and the position of the accelerator pressed by the driver. Thus, the accelerator position does not directly indicate the engine output torque, but rather ends up determining an output torque on the wheels which is directly dependent on the desired transmission output torque.

According to U.S. Pat. No. 4,893,526, a desired engine speed is determined depending on this transmission output torque, which is set by the adjustment of a continually adjustable vehicle transmission. The motor and the transmission are thus operated by an engine control or a transmission control, respectively.

A control is known from the VDI [German Engineering Society] Magazine, special issue "Abtriebstechnik" [Drive Technology], issue 134, March 1992, pp. 26–49, which determines a desired engine speed dependent on the throttle angle, and also sets that speed by adjustment of a continually adjustable transmission.

A system for setting a gear ratio is described in German Patent DE 196 26 936 A1, in which first a desired speed of the engine is determined, and the gear ratio of the transmission is adjusted depending on this desired speed. At least one of the dimensions influencing or representing the driving situation and/or the driving conditions is then determined and the determination of the desired speed of the motor is performed according to this dimension.

A process and a device for control of the drivetrain of a vehicle is known from German Patent DE 197 03 863 A1. While driving, a desired value for the output torque of the vehicle or for the transmission output torque, respectively, is preset. The different operating points of the drivetrain are characterized by output torques of the propulsion unit and speed gear ratios which differ as little as possible. Assessment dimensions are then determined for possible operating points while driving. An optimal operating point is then selected, and the transmission is set correspondingly. As an alternative to setting the gear ratio, the output speed of the propulsion unit corresponding to the operating point selected can also be set by an alteration of the gear ratio.

All of the above-mentioned technical literature is similar in that an engine speed is set by adjustment of the transmission. It is thereby possible to realize continuous wheel torque traces (e.g. hyperbolic traces of equal propulsion performance). In stepped automatic transmissions, this type of adjustment is not possible without further measures due to the discrete gear ratio changes.

Figure 7:
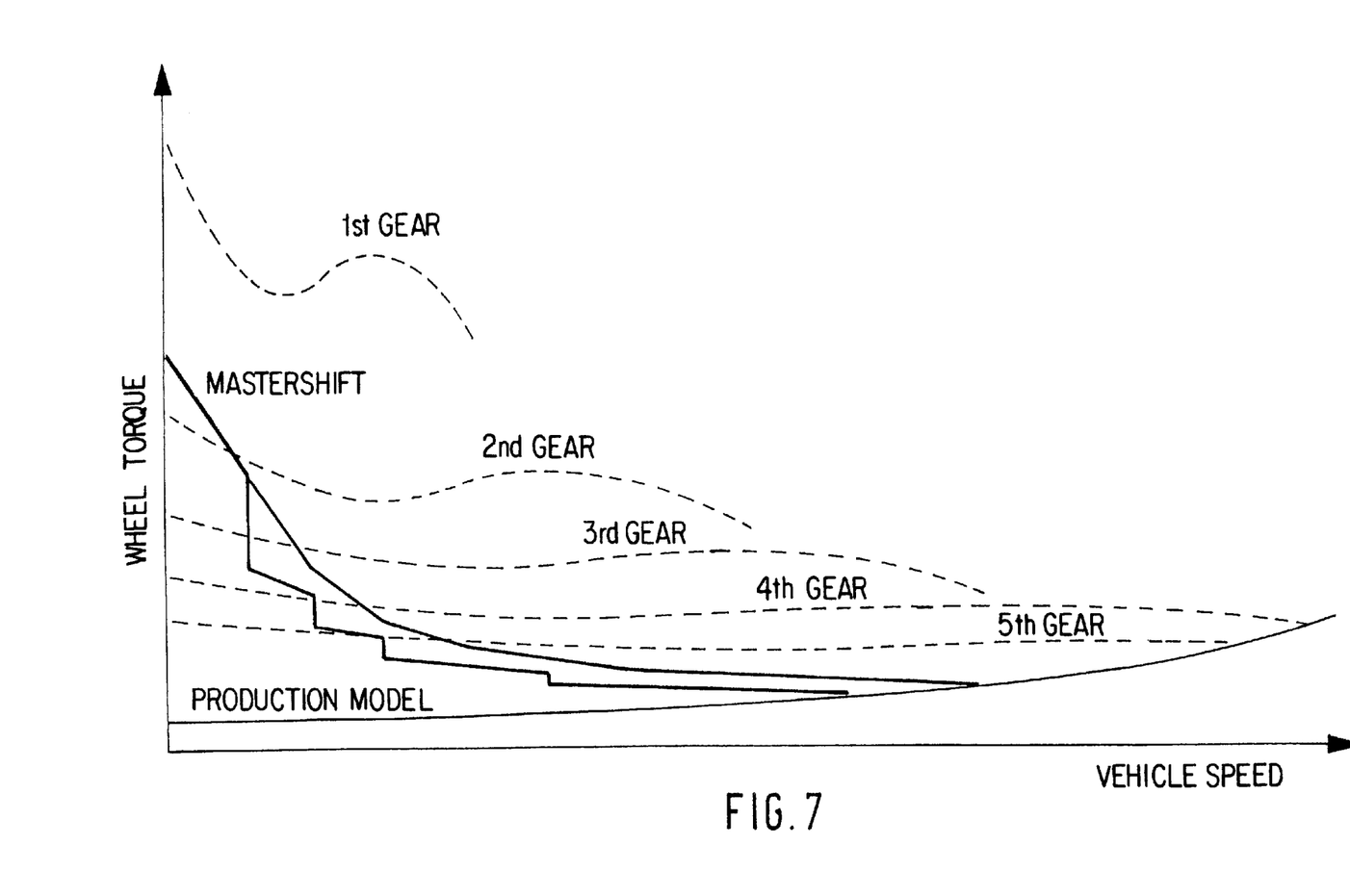
FIG. 7 a diagram which indicates relationships between wheel torque and vehicle speed at various gear ratios and constant accelerator position.

In any case, a type of adjustment is also sought for stepped automatic transmissions that, in addition to other designs, allows the wheel output torque (wheel torque) to be changed continuously at a constant accelerator position over the vehicle speed. This relationship is shown in FIG. 7. The black dashed lines indicate the relationship between the driving speed and the wheel torque at each fixed gear ratio ($1^{st}$ gear-$5^{th}$ gear) and maximum accelerator angle (engine full load). The solid black line shows the wheel torque trace when using a stepped automatic transmission with normal control at partial accelerator position (engine partial load). The white dashed line shows the physical maximum limit curve with decoupling of the throttle (engine full load) from the accelerator position (partial accelerator position). The hyperbolic gray solid line represents a wheel torque/vehicle speed trace for partial accelerator position as desired for reasons of drivability and driving performance (desired trace). Such a trace represents a continuous traction trace, for which essentially no discontinuities occur in the output torque trace if gear shifting is not considered.

The goal of the present invention is to reproduce this type of behavior with stepped automatic transmissions as well.

A further goal is to realize any desired wheel torque and/or transmission output torque which deviates from the hyperbolic shape without discontinuities. It is particularly noted that the wheel torque and the transmission output torque essentially correspond—apart from a multiplication factor.

The present invention provides drive management based on torque coordination. A torque of the drive wheels desired by the driver (wheel torque and/or transmission output torque) is realized, in that during, as well as outside of, a gear shift of the stepped automatic transmission, desired engine torques and consequently engine torque defaults, namely desired engine torque defaults affecting the filling and ignition, are calculated. These desired engine torques or engine torque defaults, respectively, are calculated by the totality of the torque coordinator, engine control, and transmission control and are converted within the bounds of physical limits. The actual transmission output torque is determined from the torque actually realized from the motor within the bounds of physical limits. Discontinuities are essentially avoided by the permanent realization of this transmission output torque, even during gear shifting.

When the stepped automatic transmission is not shifting gears, the desired torque is attained by calculating, depending on the gear ratio and the default transmission output torque, at least an engine torque default affecting the filling M_IND_ACC and/or an engine torque default affecting the ignition M_IND_GS. A definite engine torque should thereby be attained which, while shifting between the known gear ratios, provides exactly the default transmission output torque. The engine torque defaults M_IND_ACC and M_IND_GS are transmitted to the engine control and are realized by way of the control of the filling and ignition. In so doing, other parameters could possibly be included in the calculation and/or conversion of the engine torques in the controls (engine control and transmission control).

Within the physical limits of the engine, the torque defaults are generally fulfilled; the transmission output torque 10 is thus, except for shifting gears, adjusted. If the engine cannot achieve the torque default, a transmission output torque and/or wheel torque resulting from the realizable engine torque M_IND and the corresponding gear ratios is produced which deviates from the default.

During gear shifting of the stepped automatic transmission, the realization of the transmission output torque essentially occurs via a friction element provided in the stepped automatic transmission. A specific torque is transmitted corresponding to the control variable selected for the friction element. Therefore, the control variable is set during gear shifting so that exactly the desired transmission output torque is attained.

However, the load on the friction element during gear shifting from the friction output produced by slip can be problematic. To increase the service life of the friction element, it is therefore advisable to keep the friction output within a preset level. This type of adjustment has already been described in principle in German Patent DE 43 27 906 A1, in which either an ignition control and/or a control of filling to reduce the engine torque is described. With this type of influence, the engine can be adjusted to a default speed trace.

The engine torque defaults are therefore coordinated in such a fashion that first a synchronization engine torque M_IND_SYNC is calculated, which provides the engine torque required at the moment after shifting gears. The torque M_IND_ACC affecting the filling is calculated at least from the synchronization engine torque, and the engine torque M_IND_GS affecting the ignition is determined in such a way that a default speed trace dependent on the gear ratio change when shifting the transmission can be set. Except for the slip condition, the friction element of the transmission output torque and/or wheel torque is not influenced by the correction of the torque M_IND_ACC affecting the filling.

It is possible that the engine cannot produce the required engine torque M_IND_ACC. In order to overcome these difficulties, a design is effected in which, during gear shifting, the defaults are sent to the engine control corresponding to the desired defaults of the transmission output torques. However, the friction element is adjusted according to the engine torque which can be realized by the engine. This requires that the engine torque M_IND realizable by the engine be is determined by an engine model which serves, together with the synchronization engine torque M_IND_SYNC, to calculate the transmission output torque during gear shifting, and thereby the friction element control variable to be set.

Overall, a torque coordination is possible with these processes which makes it possible in a stepped automatic transmission, during and outside of gear shifting, to realize continuously running hyperbolic transmission output torques over the vehicle speed, preset, for example, by an accelerator interpreter. Torque discontinuities can thereby be avoided and traction neutrality can essentially be guaranteed.

In gear shifting, it is also possible to differentiate between upshifting and downshifting and correspondingly define suitable embodiments of the invention.

When upshifting, the engine torque M_IND_ACC affecting the filling is preferably set at the beginning of gear shifting to the synchronization engine torque M_IND_SYNC required after gear shifting. A sufficient engine torque potential provided via the filling is thereby available during gear shifting, at least in partial load operation. The adjustment of the engine torque in such a way that a definite speed curve defined by the gear ratio change is followed and preferably remains uninfluenced, except for the slip condition of the friction element of the transmission drive and/or wheel torque, by the correction of the torque M_IND_ACC affecting the filling, is performed by changing the engine torque M_IND_GS affecting the ignition. This engine torque can be calculated by the transmission control and then transmitted to the engine coordinator or directly to the engine control.

When downshifting, the problem arises that while shifting gears, for example, for engine run-up, a larger engine torque must be made available than that necessary in the form of the synchronization torque after shifting gears. If, during downshifting, as in during upshifting, the engine torque M_IND_ACC effective upon filling is set to the required engine torque value after gear shifting M_IND_SYNC, the motor will be unable to build up the necessary action torque in order to move the speed to the synchronization point over the ignition.

As a consequence, the friction element torque must be reduced in order to realize the required engine run-up. A traction-neutral drive trace cannot thereby be attained.

According to a further embodiment of the invention, to prevent this effect, during downshifting the engine torque M_IND_ACC affecting the filling is brought to a sufficient value. For this, a correction torque is calculated which is added to the synchronization torque M_IND_SYNC. In order to provide the correction torque, the torque necessary to increase the speed of the engine is particularly considered. After gear shifting, the engine torque M_IND_ACC affecting the filling is again set equal to the synchronization torque M_IND_SYNC.

Guiding the engine on a default trace in the synchronization point and/or not influencing the transmission output and/or wheel torque by correction of the torque M_IND_ACC affecting the filling, except for the slip condition of the friction element, is performed by setting the dimension M_IND_GS.

Due to physical limits of the engine torque, it is possible, that the engine torque requested by the engine via the above-mentioned engine torques M_IND_ACC and M_IND_GS is not attained. In this case, it is not prudent that (upshifting) and/or possible (downshifting) be used to set the desired output torque at the transmission output. This means that the friction element control and/or adjustment must be dealt with during gear shifting according to corrected defaults, if the engine cannot provide the desired torque. It is important that one knows the torque realizable from the motor. This realignable torque is the torque which can be set via the filling under the current basic conditions. The torque actually realizable from the engine can be calculated from an engine model.

If, according to an embodiment, the torque actually realizable by the engine is smaller than the synchronization engine torque, then a resulting synchronization transmission output torque will be calculated from the synchronization engine torque and a transfer function will be generated based on the transmission output torque before gear shifting, which represents the corrected default for the friction element control or adjustment, respectively, during gear shifting (corrected desired output torque trace).

According to a further embodiment of the invention, the actual filling engine torque M_IND_MOT is calculated from the actually realizable engine torque M_IND and the behavior, over time, of the engine.

A comparison with an engine torque M_IND_AKT, which represents the required engine torque based on the current speed multiplication of the transmission, even during gear ratio changes, provides a reserve engine torque M_IND_RES. This reserve engine torque indicates the engine potential available for realization of the speed defaults during gear shifting. It serves on the one hand for calculation of a dimension M_IND_GSZF, which in turn essentially determines the engine torque M_IND_GS affecting the ignition. The dimension M_IND_GSZF can be transmitted to the engine torque coordinator or directly to the engine control.

On the other hand, the reserve engine torque serves in the determination of whether to intervene in the friction element control and/or adjustment. At an engine potential which is not sufficient to maintain the default speed trace at the default gear shifting conditions, the friction element of the stepped automatic transmission is adjusted in such a way that there is deviation from the corrected desired output torque trace and the required speed trace thus results.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 6:
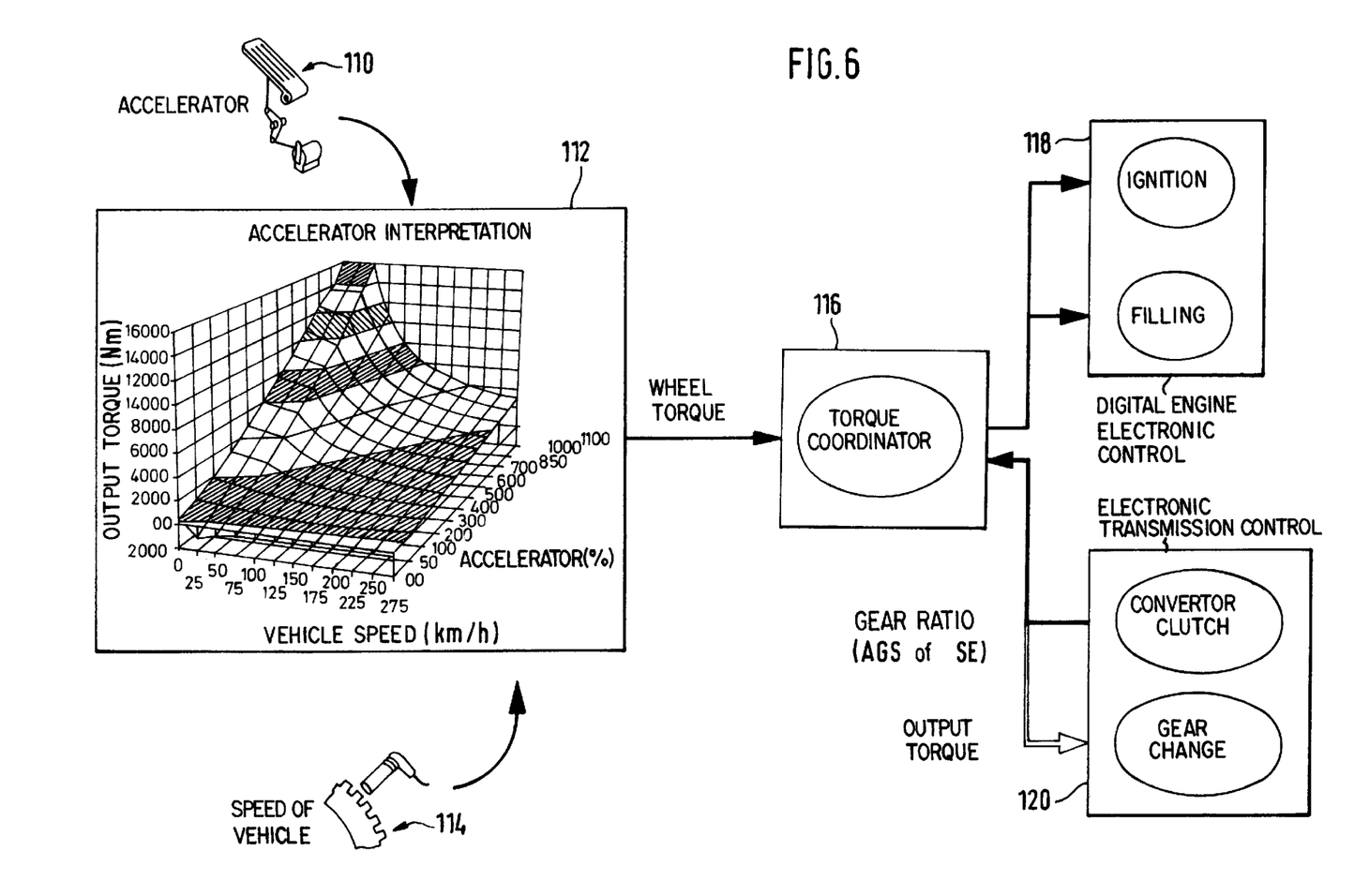
FIG. 6 a schematic representation of a device to perform the process according to the invention.

FIG. 6 shows a schematic representation of an embodiment of the present invention. A signal is produced by an electric accelerator 110 corresponding to its position and relayed to an accelerator interpreter 112. The accelerator interpreter 112 also receives a signal from a speed indicator 114 and generates a wheel torque by considering these two signals and the relationship between these two dimensions stored in its memory. Other parameters can, of course, also be considered in the generation of the wheel torque.

In addition, it is also possible in particular driving situations to write over the signal originating from the accelerator interpreter 112, and to preset another wheel torque from other systems. Distance-controlled adjustment systems, which help to keep a minimum distance from the vehicle ahead, is an example of such a situation. In addition, brake control systems could provide wheel torque defaults.

The wheel torque generated is provided to a torque coordinator 116, which generates engine torque defaults, based on the wheel torque and in consideration of the transmission settings, which it relays to a digital engine electronic control 118 (DME). Specifically, engine torque defaults M_IND_ACC and M_IND_GS, which affect the filling or the ignition respectively, are sent to the DME 118. The DME 118 generates signals for the filling and the ignition from the engine torque defaults M_IND_ACC and M_IND_GS and other parameters originating from the driving conditions, which lead in a known way to operation of the engine (not shown in FIG. 1)

The torque coordinator receives the data on the transmission settings, particularly the gear ratio just selected, from an electronic transmission control 120 (EGS). The torque coordinator 16 sends the output torque which was set or which will be set during gear shifting to the EGS 120. The EGS 120 controls a stepped automatic transmission (not shown).

In order to adjust the wheel torque default by the accelerator interpreter 112 outside of gear shifting, the torque coordinator 116 has the task of choosing the appropriate desired engine torques M_IND_ACC and M_IND_GS. The desired wheel torque or possibly a maximum possible wheel torque should thereby be attained with optimal combustion. The process and procedures for this are known, so it will not be gone into further.

In the following, the process according to the invention will be described with particular attention to shifting gears.

Figure 1:
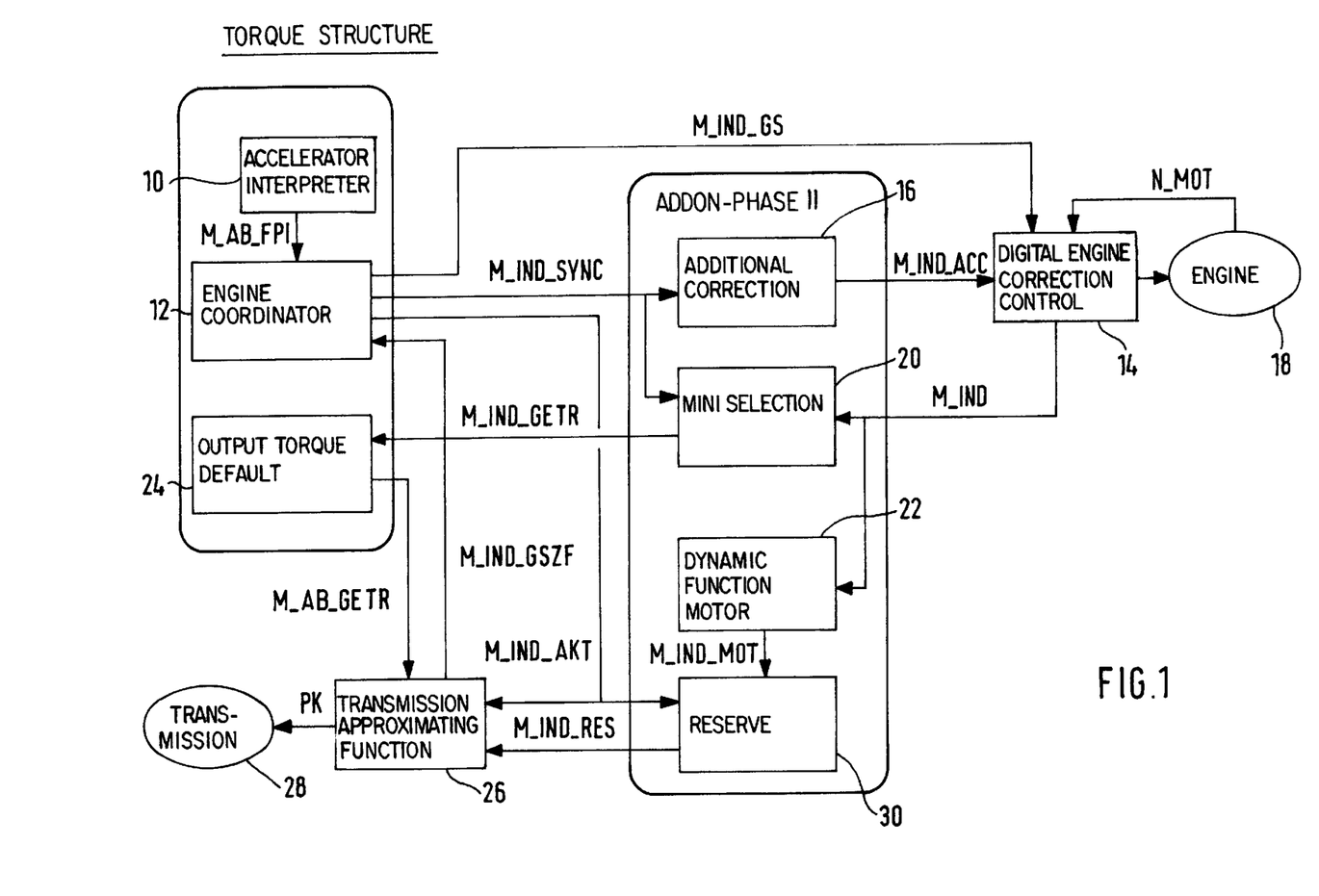
FIG. 1 a schematic block diagram of a torque structure in a process according to the invention.

In FIG. 1, a torque structure for an embodiment of the process according to the invention is shown. In it, the reference numbers 12, 16, 20, 22,. 24, and 30, which will be explained below, are assigned to the torque coordinator [*handwritten*]1 16 from FIG. 6. The reference numbers 26 and 28 are assigned to the transmission side and the reference numbers 14 and 18 to the engine side.

The accelerator interpreter 10 (corresponding to reference number 112 from FIG. 6 receives a signal from the accelerator 110 and converts it into the output torque request M_AB_FPI, which is relayed to a torque coordinator 12.

The torque coordinator 12 determines the accompanying engine torque dimensions M_IND_GS, M_IND_SYNC, and M_IND_AKT and transmit the signals to the units described below.

The torque dimension M_IND_GS is the engine torque default affecting the ignition, which is made directly available to the digital engine electronic control (DME) 14.

The synchronization engine torque M_IND_SYNC is the engine torque which is required after shifting gears. The SYNC signal is made available to a unit "additional correction" 16. The unit "additional correction" 16 calculates an additional engine torque potential required during gear shifting. This potential can be determined from the engine data and the transmission data and can take into account, for example, the torque which is required for engine run-up during downshifting. The engine torque potential is added to the synchronization engine torque M_IND_SYNC and is relayed to the digital engine electronic control 118, 14 in the form of the engine torque default M_IND_ACC affecting the filling (cf. also descriptions for FIGS. 3a and 5a). The engine torque default M_IND_ACC affecting the filling determines the filling in the cylinders as the desired engine torque.

From the above-mentioned data, particularly from the filling data M_IND_ACC and other driving conditions— among other things the speed data N_MOT—the digital engine electronic control 118, 14 calculates not only the control information for the engine 18, but also the engine torque M_IND actually realizable by the engine 18. This engine torque M_IND, which is limited by the engine torque default M_IND_ACC affecting the filling, is transmitted to the units "MIN-selection" 20 and "dynamic function motor" 22. Their functions are explained below.

The unit "MIN selection" 20 also receives the synchronization engine torque M_IND_SYNC. The minimum is chosen from the values available to the unit "MIN selection" 20 and the result is transmitted as M_IND_GETR to the unit "output torque default" 24. The unit "output torque default" 24 calculates a transmission output torque M_AB_GETR from the dimension M_IND_GETR and relays this torque to a transmission approximating function 26 realized in the transmission control 120. The minimum selection thereby ensures that an engine torque which may be added by the unit "additional correction" 16 does not affect the dimension M_IND_GETR and thereby the transmission output torque M_AB_GETR.

If the engine has sufficient potential available, the torque M_IND realizable by the engine will not fall below the synchronization engine torque and the synchronization engine torque M_IND_SYNC will be chosen by the unit "MIN selection" 20. If, however, the capacity of the engine is not sufficient, the torque M_IND realizable by the engine will be below the synchronization engine torque M_INC_SYNC, and M_IND will then be chosen by the unit "MIN selection" 20 and relayed to the unit output torque default 24. As a consequence, the friction element (e.g. a clutch) will be adjusted to a transmission output torque M_AB_GETR which takes the lower engine torque into account.

As will be described further below, a dimension M_IND_GSZF is generated by the transmission approximating function 26—and thus the transmission control—which essentially corresponds to the engine torque default M_IND_GS affecting the ignition and which is relayed to the torque coordinator 12. Alternatively, the engine torque dimension M_IND_GSZF can be immediately converted to M_IND_GS.

A unit "dynamic function motor" 26 makes an engine torque dimension (actual torque according to filling) M_IND_MOT, which considers the behavior over time of the engine, available to a unit "reserve" 30 on the basis of the engine torque M_IND realizable by the engine.

Furthermore, a torque value M_IND_AKT is made available to the unit "reserve" 30 from the torque coordinator 12 which represents the engine torque required during gear shifting in consideration of the gear ratio change, with shifting influences not considered.

The unit "reserve" 30 calculates an available engine torque potential M_IND_RES from the dynamic dimension M_IND_MOT and the engine torque M_IND_AKT and makes this dimension available to the unit "transmission approximating function" 26.

The unit "transmission approximating function" 26 calculates the control and/or adjustment data for the stepped automatic transmission and/or the friction element contained in same from the data available. In addition, the dimension M_IND_GSZF, which influences the ignition, is calculated from this information.

The result of the conversion of the preceding torque structure will now be described in more detail with reference to the diagrams of the FIGS. 2 to 5.

Figure 2A:
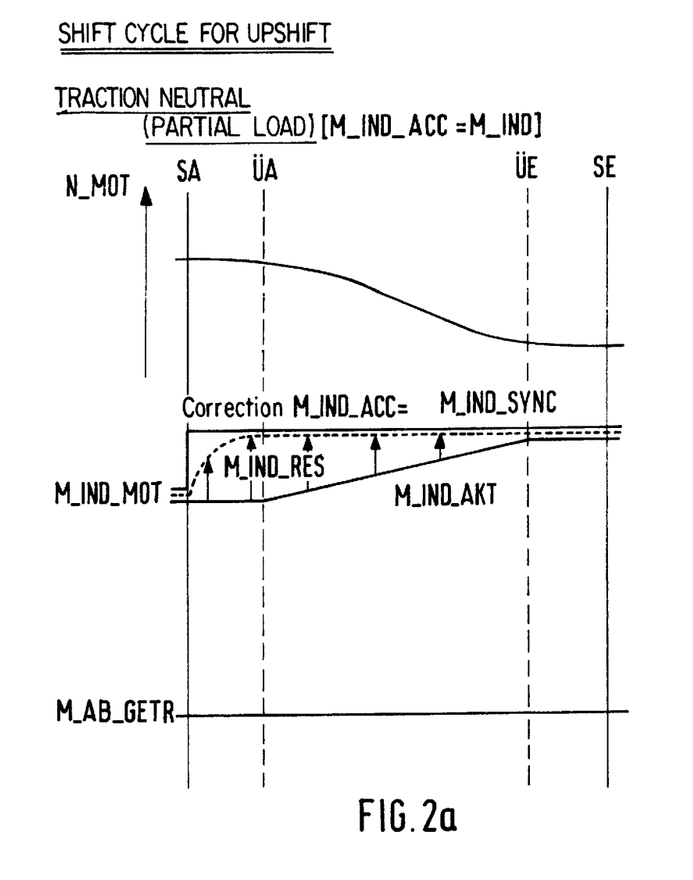
FIGS. 2a and 2b diagrams which explain the shifting cycle for an upshift according to the process according to the invention.

In FIG. 2a, a diagram which illustrates a gear shifting cycle for an upshift is shown, with this gear shifting occurring during partial load operation. In this case, during gear shifting M_IND_ACC is equal to M_IND_SYNC, namely the desired torque after shifting gears. An additional correction torque is not necessary, as the motor reduces its speed during gear shifting.

In the upper portion of diagrams 2 to 5, the speed N_MOT is depicted during the temporal trace of gear shifting (SA=beginning of gear shift and SE=end of gear shift). This speed trace is controlled.

In the middle portion of the diagrams, the engine torque dimensions and/or engine torque defaults are shown.

In the lower portion of the diagrams, each of the transmission output torques M_AB_GETR is shown.

In upshifting, the engine torque default M_IND_ACC affecting the filling is raised in one step at the beginning of gear shifting to the value which corresponds to the induced torque after gear shifting (synchronization engine torque) M_IND_SYNC.

In partial load operation, as is shown in FIG. 2a, this requested torque can also be derived from the engine torque M_IND realizable from the engine. If the behavior over time of the engine is considered, a dynamic engine torque M_IND_MOT thereby results, as is represented by the dashed line in FIG. 2a. A positive engine torque potential M_IND_RES (upward arrow) thereby results with respect to the torque M_IND_AKT required, without shifting influences, during the overall gear shifting. This engine torque potential can be used in upshifting to compensate for the brief, principle-conditioned interruption of the output torque M_AB ISTGETR at the beginning of gear shifting as shown in FIG. 4.

Figure 4:
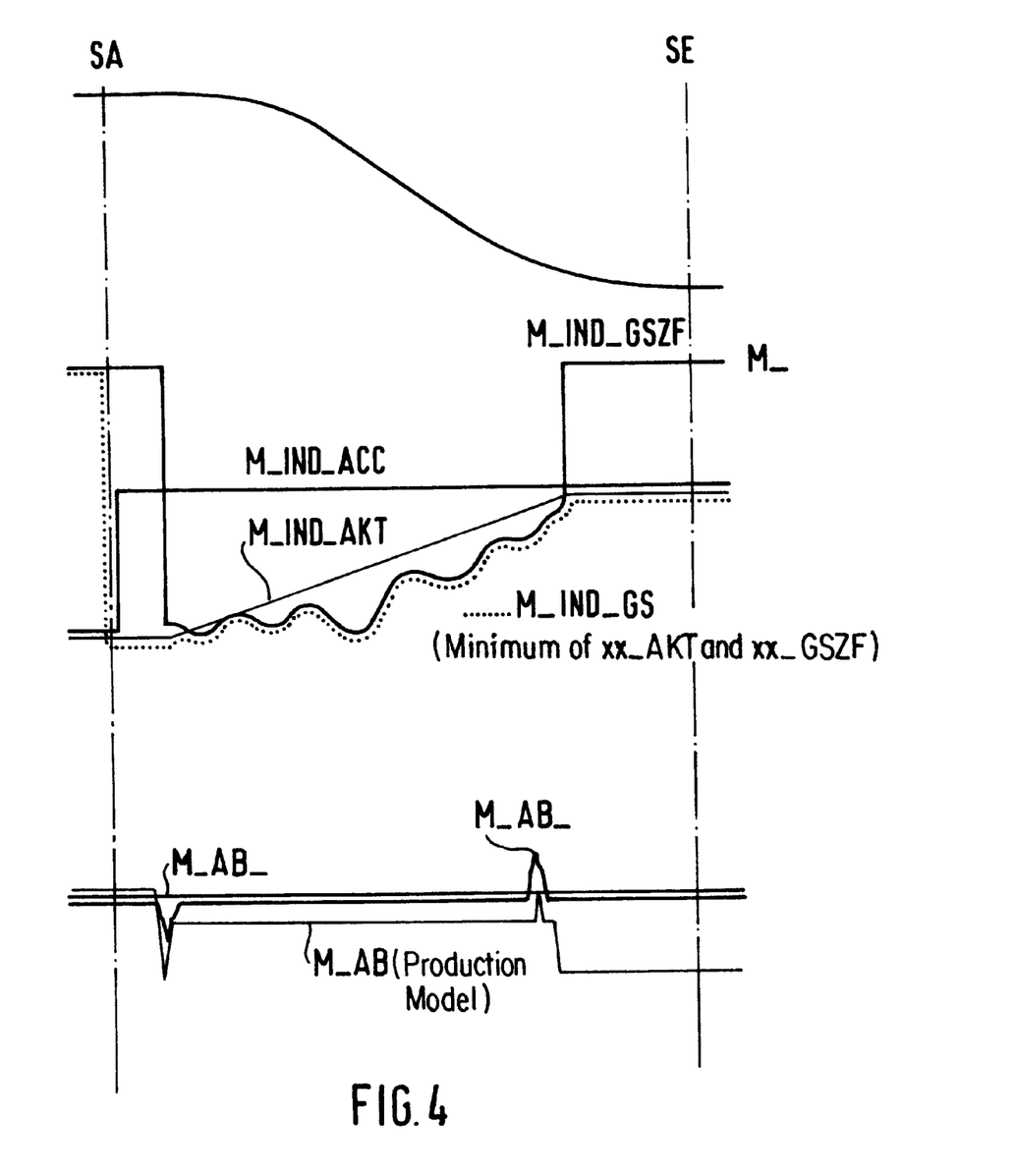
FIG. 4 a diagram corresponding to those in FIG. 2 with the engine torque affecting the ignition additionally indicated.

The engine torque default M_IND_ACC affecting the filling rises in steps at the beginning of gear shifting SA in accordance with FIG. 4. The engine torque M_IND_GS affecting the ignition has a much more complex trace and is essentially determined and adjusted by the transmission control 120. In particular, quick reactions and adjustments can be made by alterations and defaults of the engine torque M_IND_GS affecting the ignition. This leads to a largely optimal torque adjustment during gear shifting, so that the friction element does not requires an excessively high friction output.

The advantageous effects of the preceding torque control can be recognized in the lower part of FIG. 4. While the output torque still changes in steps in current production vehicles M_AB (production), the output torque M_AB_ISTGETR attained by means of the process according to the invention only deviates in two peak positions from the ideal line M_AB_SOLLGETR (constant output torque).

Figure 2B:
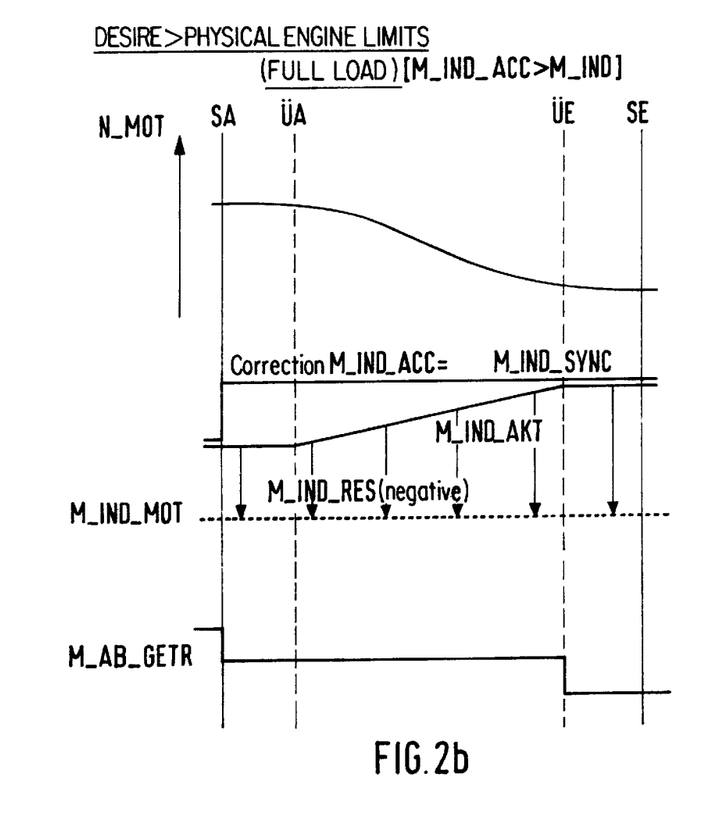

In diagram 2b, the torque trace is represents in a situation in which the desire of the driver exceeds the torque capacity of the engine (physical limits). In this case, the engine torque M_IND_ACC affecting the filling will also be set equal to the desired torque after gear shifting (synchronization engine torque) M_IND_SYNC. Nonetheless, a negative engine torque potential M_IND_RES (downward arrow) results from the insufficient engine torque capacity. This is transmitted to the transmission approximating function 26.

The default of the transmission output torque M_AB_GETR will be converted in this case, as can be seen in FIG. 2b, in a freely selectable transfer function (here step-shaped) to the level realizable after gear shifting.

Figure 3A:
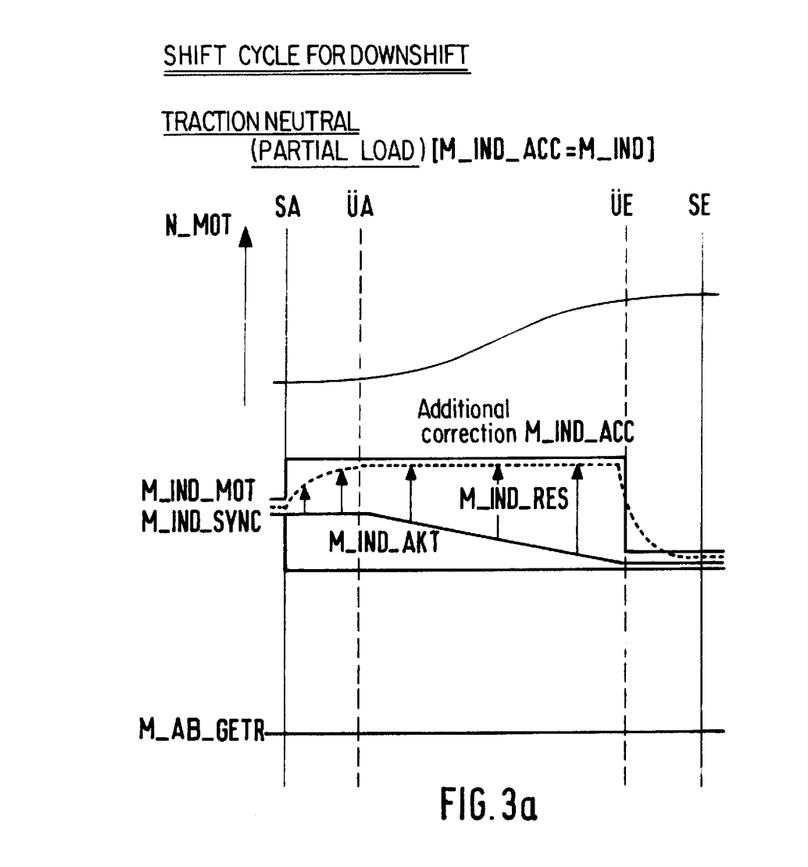
FIGS. 3a and 3b diagrams which represent the shifting cycle for a downshift according to the process according to the invention.
Figure 3B:
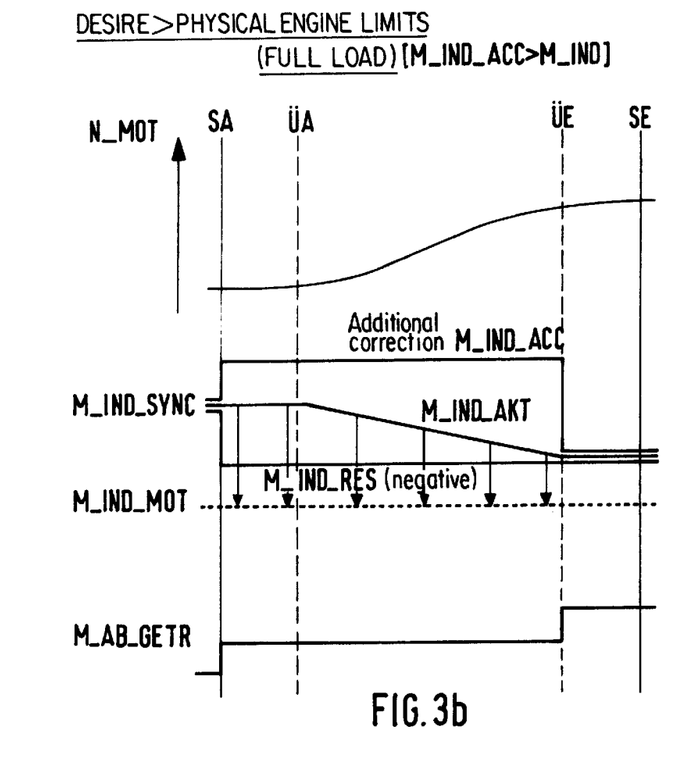

FIGS. 3a and 3b, as well as 5, are similar representations to those in FIGS. 2a and 2b and/or 4, but show the trace of the engine torque during downshifting.

In FIG. 3a, a diagram is shown which explains a shift cycle during a downshift, with this gear shifting occurring in partial load operation.

During downshifting, an additional torque component (additional correction) is added to the synchronization engine torque M_IND_SYNC (cf. FIG. 3a). The goal is to create a larger torque potential via the engine torque default M_IND_ACC affecting the filling (cf. FIG. 5a, without additional correction), so that the engine run-up necessary during downshifting can be realized. The engine speed can thereby also be brought to the synchronization point when downshifting. If this additional potential is not built up, then sufficient torque potential is not present to bring the speed to the synchronization point via the ignition M_IND_GS. As a consequence, a traction neutral output torque trace cannot be attained.

In any case, a larger torque potential during downshifting is presently used in order to avoid discontinuities in the output torque trace. The unit "additional correction" 16 receives the synchronization engine torque dimension M_IND_SYNC from the torque coordinator 12, which correspondingly communicates the filling default at the end of gear shifting and adds the additional correction to it at the beginning of gear shifting. The resulting filling default M_IND_ACC (cf. FIG. 3a) is relayed to the digital engine electronic control 14 and represents the desired engine torque to be set during filling.

The engine run-up during downshifting thus no longer has to be realized by reduction of the transfer capability of the friction element. The transfer capability of the friction element can instead be used to maintain the desired transmission output torque M_AB_GETR. A traction neutral output torque trace can thus also be guaranteed during downshifting.

Figure 5A:
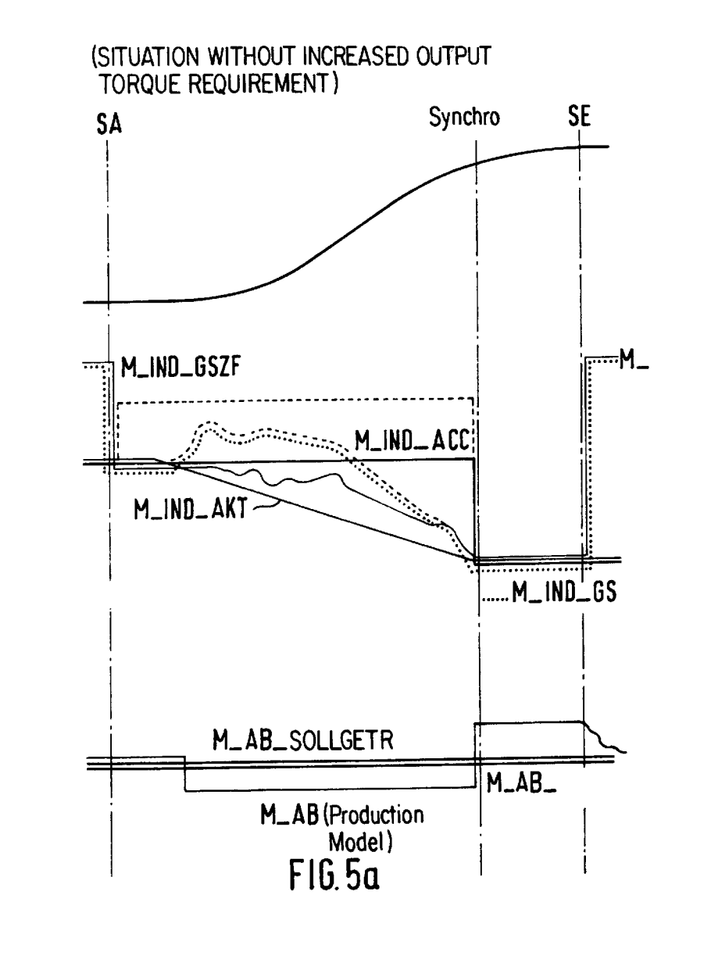
FIGS. 5a and 5b diagrams corresponding to those in FIG. 3, with the engine torque affecting the ignition also indicated.
Figure 5B:
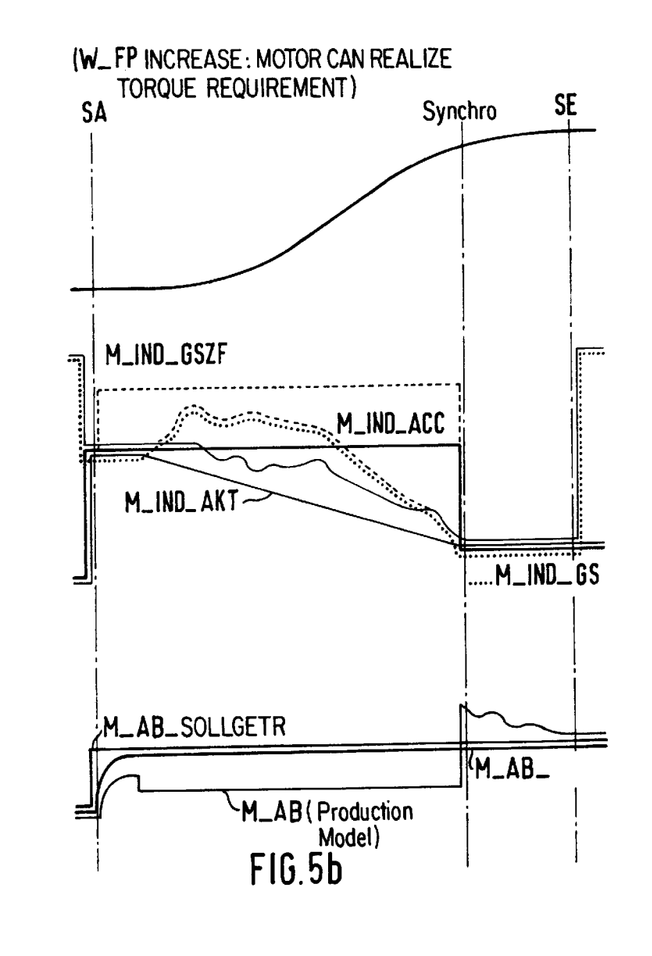

FIG. 5b corresponds to FIG. 5a, with the exception that an increase of the output torque is desired and the engine can realize this request. In this case, the individual engine torque default values are chosen so that, at the beginning of gear shifting SA, an increase of the output torque is carried out and, during gear shifting, the output torque of the transmission also follows the desired trace.

In the representation according to FIG. 3b, the output torque desired by the driver is greater than the physical capability of the engine. The engine torque potential M_IND_RES of the function "additional correction" is negative and the output torque can only be increased gradually. This can be seen in the lower portion of FIG. 3b, in which the torque jumps, in the transmission output torque, occur at the beginning of gear shifting and at the end of the gear ratio change.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for engine and transmission control in a motor vehicle with an internal combustion engine controlled by an engine control and a stepped automatic transmission controlled by a transmission control, comprising the steps of:
  presetting of a desired transmission output torque when and realization of the desired transmission output torque,
  wherein the step of realization, when gear shifting of the stepped automatic transmission is not occurring, includes the further steps of:
  detecting at least the gear ratio,
  calculating at least one of a first engine torque default (M_IND_ACC) affecting the filling and a second engine torque default (M_IND_GS) affecting the ignition from at least the gear ratio and the transmission output torque, and
  relaying said at least one of said calculated first and second torque default to the engine control which controls the filling and the ignition of the internal combustion engine, and
  wherein, during gear shifting, the step of realization includes the further steps of:
  calculating a synchronization engine torque default (M_IND_SYNC) which indicates the engine torque required at the moment after gear shifting,
  calculating the engine torque default (M_IND_ACC) affecting the filling from at least the synchronization torque default,
  determining the engine torque defaults (M_IND_GS, M_IND_GSZF) affecting the ignition in such a way that a default speed trace dependent on the ratio change in shifting the transmission can be set,
  determining the engine torque (M_IND) realizable by the engine,
  calculating a transmission output torque (M_AB_GETR), or a behavior of the transmission output torque (M_AB_GETR), taking into account the minimum of the synchronization engine torque default (M_IND_SYNC) and the engine torque (M_IND) realizable by the engine, and
  setting said output torque or said behavior of said output torque via a friction element of the transmission.

2. Process according to claim 1, wherein an accelerator position and a driving speed are detected and
  the transmission output torque (M_AB_GETR) is determined taking into account at least the accelerator position and the vehicle speed.

3. Process according to claim 2, wherein a transmission output torque trace is preset which changes essentially continuously over speed at a constant accelerator position.

4. Process according to claim 1, wherein a correction torque is determined which defines a torque potential required during the gear ratio change in excess of the synchronization engine torque default (M_IND_SYNC) and during gear shifting the engine torque default M_IND_ACC affecting the filling is calculated as the sum of the synchronization torque default (M_IND_SYNC) and the correction torque.

5. Process according to claim 1, wherein the engine torque (M_IND) realizable by the engine is calculated with the aid of an engine model from the engine torque default M_IND_ACC affecting the filling and a minimum of one further parameter.

6. Process according to claim 1, wherein a filling actual torque (M_IND_MOT) is calculated from the engine torque (M_IND) realizable by the engine taking into account the time characteristic of the engine, a reserve engine torque (M_IND_RES) is calculated as the difference of this filling actual torque (M_IND_MOT) and an engine torque (M_IND_AKT), which represents the engine torque required without gear shifting at any gear ratio during the gear ratio change, and an engine torque dimension (M_IND_GSZF) is calculated in the transmission control with the incorporation of the reserve engine torque (M_IND_RES) which is reproduced in the engine torque default M_IND_GS affecting the ignition.

7. Process according to claim 6, wherein a required engine torque is determined which is necessary to maintain the default speed trace with the default shifting conditions and if the reserve engine torque (M_IND_RES) is below the required engine torque, a friction element control and/or adjustment is performed in such a way that the default desired speed results.

8. Device for engine and transmission control in a motor vehicle with an internal combustion engine controlled by an engine control and a stepped automatic transmission controlled by a transmission control, said device comprising:

a preset output torque unit outputting a preset transmission output torque signal, a torque coordinator receiving the preset output torque signal, an engine control unit connected to said torque coordinator for providing an engine torque (M_IND) realizable by the engine, and a transmission control unit connected to the torque coordinator, wherein said torque coordinator, except during gear shifting of the stepped automatic transmission, calculates at least one of a first engine torque default (M_IND_ACC) affecting the filling and a second engine torque default (M_IND_GS) affecting the ignition, as a function of at least the gear ratio and the transmission output torque, and transmits said at least one first and second engine torque default to the engine control, which controls the filling and the ignition of the internal combustion engine, wherein said torque convertor, during gear shifting, calculates a synchronization engine torque default (M_IND_SYNC) which indicates the engine torque required at the moment after gear shifting, calculates the first engine torque default (M_IND_ACC) affecting the filling during gear shifting from at least the synchronization engine torque default (M_IND_SYNC), and determines the second engine torque default (M_IND_GS) affecting the ignition in such a way that a default speed trace dependent on the gear ratio change upon gear shifting of the stepped automatic transmission can be set, and wherein the engine and transmission control units calculate and adjust a transmission output torque (M_AB_GETR) or a behavior of the transmission output torque (M_AB_GETR) as a function of the lesser of the synchronization engine torque default (M_IND_SYNC) and the engine torque (M_IND) realizable by the engine.

9. Device according to claim 8, wherein the torque coordinator includes a correction unit which is designed to determine an engine torque potential for the period of time during gear shifting and to determine the engine torque default (M_IND_ACC) affecting the filling as the synchronization engine torque default (M_IND_SYNC) plus the engine torque potential.

10. Device according to claim 8, wherein the torque coordinator includes a reserve unit which calculates a reserve torque dimension (M_IND_RES) from the engine torque (M_IND) realizable by the engine and a time characteristic of the engine and transmits it to the transmission control.

11. A vehicle engine and automatic transmission control device comprising:

a preset output torque unit outputting a p reset transmission output torque signal;

a torque coordinator receiving the preset output torque signal;

an engine control unit connected to said torque coordinator for providing an engine torque realizable by said engine; and a transmission control unit connected to torque coordinator, wherein said torque coordinator includes a first means, operable except during gear shifting of the automatic transmission, for calculating at least one of a first engine torque default (M_IND_ACC) affecting the filling and a second engine torque default (M_IND_GS) affecting the ignition, as a function of at least the gear ratio and the transmission output torque, and for transmitting said at least one first and second engine torque default to the engine control, which controls the filling and the ignition of the internal combustion engine, a second means, operable during gear shifting, for calculating a synchronization engine torque default (M_IND_SYNC) which indicates the engine torque required at the moment after gear shifting, for calculating the first engine torque default (M_IND_ACC) affecting the filling during gear shifting from at least the synchronization engine torque default (M_IND_SYNC), and for determining the second engine torque default (M_IND_GS) affecting the ignition in such a way that a default speed trace dependent on the gear ratio change upon gear shifting of the stepped automatic transmission can be set, wherein said engine and transmission control unit include a means for calculating and adjusting a transmission output torque (M_AB_GETR) or a behavior of the transmission output torque (M_AB_GETR) as a function of the lesser of the synchronization engine torque default (M_IND_SYNC) and the engine torque (M_IND) realizable by the engine.

* * * * *